(12) United States Patent
Tribble et al.

(10) Patent No.: US 7,529,937 B2
(45) Date of Patent: May 5, 2009

(54) SYSTEM AND METHOD FOR ESTABLISHING THAT A SERVER AND A CORRESPONDENT HAVE COMPATIBLE SECURE EMAIL

(75) Inventors: Eric D. Tribble, Redmond, WA (US); Trevor W. Freeman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 11/107,011

(22) Filed: Apr. 15, 2005

(65) Prior Publication Data

US 2006/0200669 A1    Sep. 7, 2006

Related U.S. Application Data

(60) Provisional application No. 60/659,279, filed on Mar. 7, 2005.

(51) Int. Cl.
*H04L 9/00* (2006.01)
(52) U.S. Cl. .................... 713/168; 713/181; 726/26
(58) Field of Classification Search ............. 726/26–30; 713/160–168, 150, 181
See application file for complete search history.

(56) References Cited

U.S. PATENT DOCUMENTS 5,958,005 A     9/1999  Thorne et al.
7,188,358 B1 *  3/2007  Hisada et al. .................. 726/2
7,191,252 B2 *  3/2007  Redlich et al. .............. 709/246
2002/0078351 A1  6/2002  Garib
2005/0268101 A1  12/2005  Gasparini et al.

FOREIGN PATENT DOCUMENTS

CA     2390817 A1    12/2003
WO     00/07355      2/2000
WO     2005/008941   1/2005

\* cited by examiner

*Primary Examiner*—Hosuk Song
(74) *Attorney, Agent, or Firm*—Senniger Powers LLP

(57) ABSTRACT

A discovery secret is transmitted from the source domain to the correspondent domain. The discovery secret includes a data element specific to the correspondent domain and. The discovery secret includes a source domain address to which the correspondent domain is permitted send a message in order to determine that a potential correspondent has compatible secure email technology so that a link between the source domain and the correspondent domain may be established. The discovery secret is received by the correspondent domain including receiving the data element and the source domain address. An invitation is transmitted from the correspondent domain to the source domain address. The invitation includes the data element or an element corresponding to the data element. The source domain initiates a process to establish a link with the correspondent domain upon receipt by the source domain of the invitation.

17 Claims, 8 Drawing Sheets

SYSTEM AND METHOD FOR ESTABLISHING THAT A SERVER AND A CORRESPONDENT HAVE COMPATIBLE SECURE EMAIL

TECHNICAL FIELD

Embodiments of the present invention relate to the field of establishing a compatible interconnection between two domains. In particular, embodiments of this invention relate to a system and method to reveal and discover mail servers with advanced capabilities.

BACKGROUND OF THE INVENTION

Some prior systems attempt to identify potential correspondents by communicating directly. However, these systems become vulnerable to attackers when communicating and, in particular, can cause or be vulnerable to SPAM and denial of service attacks.

Accordingly, a system is desired to address one or more of these and other disadvantages by discretely identifying a potential correspondent so that a secure link between a server and a potential correspondent may be established.

SUMMARY OF THE INVENTION

Embodiments of the invention include an email server which occasionally adds an additional header to a message that will be delivered to potential correspondent domains. The data in the header includes a secret that is specific to a message sent to a particular correspondent domain and an email address to which administrative messages from that correspondent domain can be directed to the server. If mail at the correspondent domain is also directed through a server that implements this embodiment, then it will detect the additional header and determine that there may be a compatible server at the originating domain. It can then direct administrative traffic such as requests to establish a secure connection to the contained administrative email address. Such administrative messages must also contain the secret that was provided for that correspondent domain. The mail accepter for administrative mail at the originating domain can then discard any mail that purports to be from the correspondent domain but that does not contain the secret corresponding to the correspondent domain.

In an embodiment, the invention includes a method for determining that a potential correspondent domain has compatible secure email technology in order to establish a link between a source domain and a correspondent domain. A discovery secret is transmitted from the source domain to the correspondent domain. The discovery secret includes a data element specific to the correspondent domain and a source domain address to which the correspondent domain is permitted send a message in order to establish compatibility between the source domain and the correspondent domain. The source domain receives via the source domain address an invitation from the correspondent domain. The invitation includes the data element or an element corresponding to the data element which may be used by the correspondent domain to initiate a process to establish compatibility with the correspondent domain.

In accordance with one aspect of the invention, a data structure is provided for a discovery secret to be transmitted from a source domain to a correspondent domain for establishing that the correspondent and source domains have compatible secure email technology or other email or communication technology. The discovery secret includes a message; a header relating to the message; and an additional header attached to the message. The additional header includes (1) a data element specific to the correspondent domain and including a source domain address to which the correspondent domain is permitted to send a message to the source domain in order to establish that the correspondent and source domains have compatible secure email technology, (2) a discovery secret and (3) an expiration date.

In another form, the invention comprises a system for establish that the correspondent and source domains have compatible secure email technology or other email or communication technology. A source domain server transmits a discovery secret to the correspondent domain. The discovery secret includes a data element specific to the correspondent domain and a source domain address to which the correspondent domain is permitted send a message in order to establish that the correspondent and source domains have compatible secure email technology. A correspondent domain computer receives the discovery secret including the data element and the source domain address. The correspondent domain computer transmits an invitation from the correspondent domain to the source domain address. The invitation includes the data element or an element corresponding to the data element.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The invention relates to a system and method for determining that a potential correspondent has compatible secure email technology in order to begin the process of establishing a link between a server and a correspondent. In particular, the invention relates to a system and method for initiating the process of establishing a secure link for the deployment of secure email. The invention allows a server to determine that a potential correspondent can be established as a target because of compatible secure email technology. As a result, once a potential correspondent is identified, the server can exchange key material information with the potential correspondent in order to establish the secure link.

Figure 1:
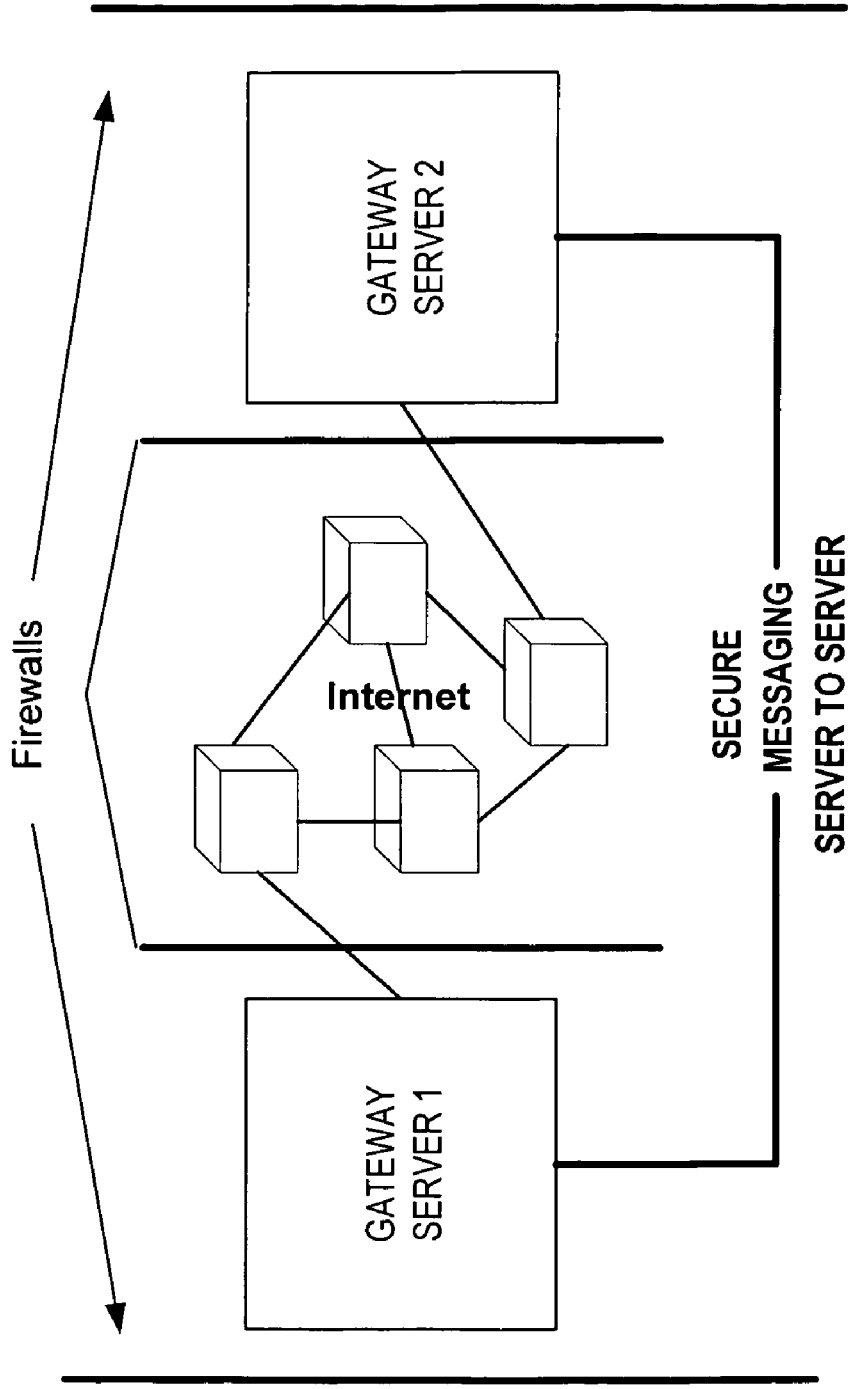
FIG. 1 is an exemplary block diagram of gateway servers 1 and 2 having secure messaging therebetween.

The objective of domain signing and encryption according to the invention is to provide a transport independent mechanism to exchange confidential and server authenticated messages between servers. FIG. 1 is an exemplary block diagram of gateway servers 1 and 2. The gateway servers 1 and 2 have a secure messaging link therebetween. The servers may be separated by an optional firewall through which they may be connected to bridgehead servers (not shown), which may be are part of a separate, secure messaging system. Gateway servers 1 and 2 form a sub-network that may be located between a trusted internal network, such as the secure messaging system linking bridgehead servers and an untrusted external network, such as the public internet. Firewalls are also positioned between the gateway servers and the Internet. The gateway servers treat all mail as clear text and encrypt all mail gateway to gateway. If the gateway and bridgehead servers do not share the same encryption keys, the gateway servers cannot decrypt bridgehead server encrypted mail.

There is a need for a single point of administration for the authoritative data for all internal and external relationships. Optionally, a single master model rather than a multiple-master model is implemented because it is simpler and because it does not have to resolve replication conflicts. Secure message management (SMM) operations are usually infrequent and delays in SMM operations should not delay mail delivery, but only delay the setup of new secure associations. The database size is usually small (e.g., hundreds of thousands of records of a few K each; it could get up to several megabytes, but likely not 100s of megabytes) so that there is sufficient time to repair or replace hardware or do a system restore before any loss of service. In one embodiment, critical data for operation is replicated to other gateway servers. Since there is no single point of management, not all data is replicated and the replicated data is read only.

A server may engage with a number of other correspondent domains to set up mail links for a specific project. However, the management coordination of such projects does not usually scale. For secure messaging to make an impact, secure mail is enabled with the majority of the organization's business correspondents. This requires the ability to discover which correspondents have gateway servers installed and have a simple organization-to-organization workflow in order to determine whether there should be negotiation to establish a secure mail link.

The invention enables discovery of gateway servers installed in an organization's correspondents so that a secure connection can be set up. To facilitate discovery, the server indicates (e.g., advertises) the presence of itself with outbound mail by some indication (or advertisement), herein referred to as a discovery secret. To minimize the discovery secret process being vulnerable to attack, the system and method of the invention do not use a hard coded address in its discovery secret. However, it is contemplated that in one embodiment a single address may be used with a discovery secret to be included in any email to that address. As a result, only messages from parties that have seen the discovery secret (which includes the discovery secret) can send to the administrative address. Therefore, in a preferred embodiment, a single address is used, and the discovery secrets must be provided in every message. Alternatively, the indicated address is a random mailbox name which can rotate at a reasonable interval, e.g., weekly. While this random approach is an option, it is usually a less preferred embodiment. To ensure that the vulnerabilities are minimized, the discovery secret is bound to the sending domain, e.g., the source domain, and to the domain to which it is sent, e.g., the correspondent domain. In the event that the discovery secret is available to a third party the only domain that would be affected is the domain whose invitation address was compromised.

In one form, the discovery secret may be an 822 header containing the ephemeral 822 address for negotiation and the expiration time of the 822 address relative to when the message was sent. Inbound mail is scanned by the receiving server (e.g., correspondent or correspondent server) for discovery secrets from gateway servers and compared against a list of known gateway servers. Any additions to that list are communicated to the local administrative SMM. On discovery of a new correspondent, the SMM can send a probe message (e.g., an invitation) to the administrative address at the other SMM to offer a turn on domain signing and encryption or other services. On receipt of an invitation from another SMM administrator, if the message is verifiable under the existing trust policy then the local SMM could invoke a policy to automatically accept the invitation. Alternatively, the SMM administrator may require manual approval before accepting the invitation. On receipt of the invitation acceptance by the server, if the message is intrinsically verifiable, then the receiving SMM would invoke a policy to automatically start using domain signing and encryption. First, it sends an encrypted ping message with a nonce, and waits for an acknowledgement (that includes the nonce) to ensure that secure mail can be decrypted by the other side. Note that the invitation and acceptance messages are signed with the SMM's authoritative key, whereas the ping and acknowledgement are signed with the signing key (which is a child of the authority key). The process that does routine mail signing and encryption only has the authority to sign with the signing key (for security). Thus, the ping and acknowledgement also verify that secure mail will work with the signing key, not just the authority key. The configuration of a new secure domain is an asynchronous process and is not used for real data until the link is confirmed operationally by receipt of the ping acknowledgements before any administrative prompting.

Figure 2:
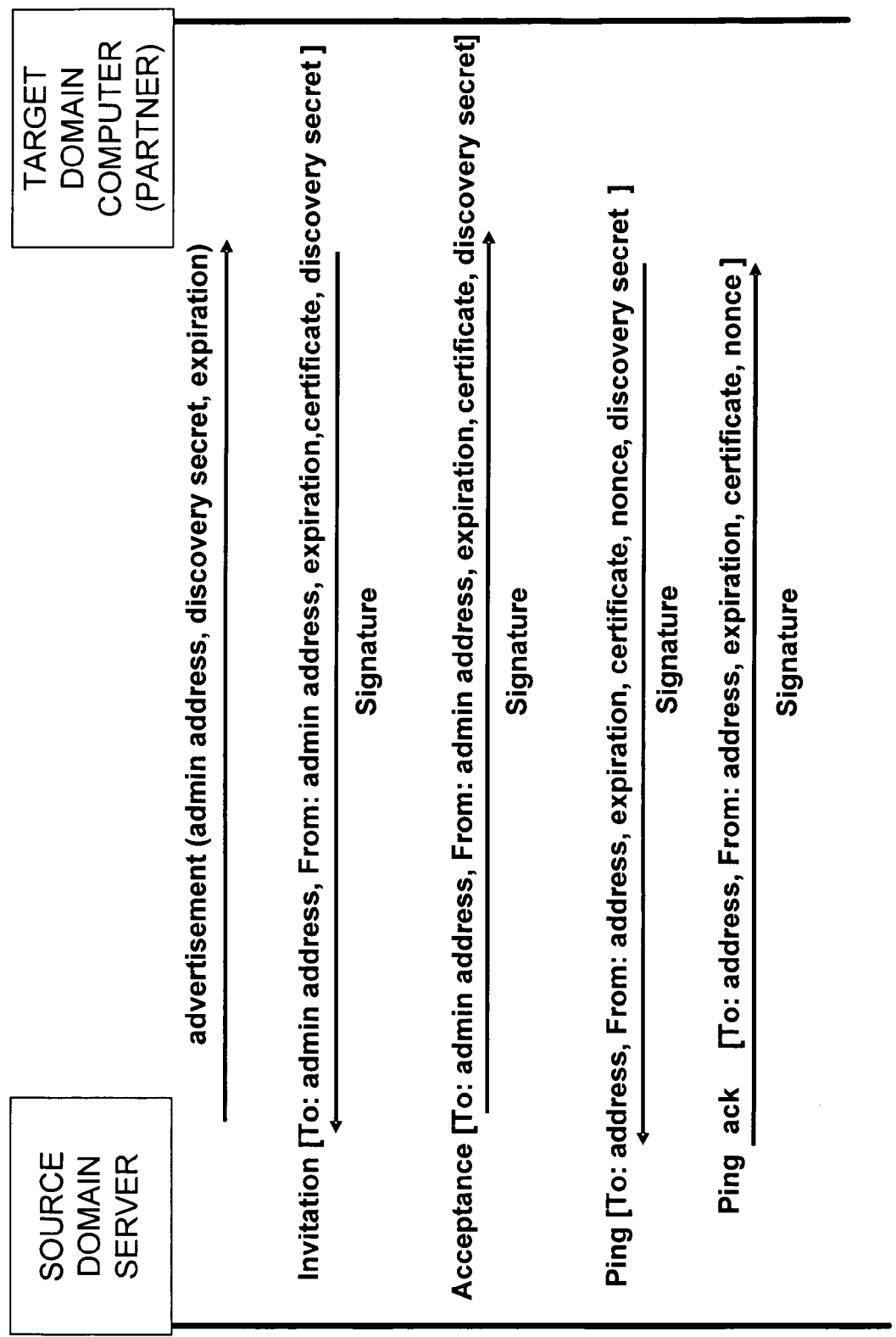
FIG. 2 is an exemplary diagram illustrating workflow between a source domain server and a potential correspondent (e.g., a correspondent domain server) according to the invention.

FIG. 2 is an exemplary diagram illustrating workflow between a source domain server and a potential correspondent (e.g., target domain computer) according to the invention. Initially, a discovery secret including an administrative address, a discovery secret and an expiration date are sent from the server to the correspondent. The discovery secret should also contain the sending and receiving domains, so that one can quickly determine whether they are for your domain (because they might have been relayed as the result of a mailing list). When the correspondent recognizes the discovery secret, the correspondent sends an invitation back to the server addressed to the administrative address that was part of the discovery secret. In one embodiment, it only responds to the discovery if it has also sent mail "to" the domain. Thus, a spammer cannot induce the source domain to invite them (because you never sent mail to them in the first place). The invitation from the correspondent includes an administrative address of the correspondent, the expiration, a certificate and the discovery secret and other information (e.g., workflow ID, contact information, sending and receiving domains, etc.). In response, the server sends an acceptance to the correspondent's administrative address from the server's administrative address and includes in the acceptance the expiration, the certificate, the discovery secret and a signature. This is administratively optional, though the default policy may include an automatic response. In one embodiment, it can also be restricted to manual, or to only respond if the inviter's certification meets some trust policy. After receipt of the acceptance, the correspondent pings the server and the ping is acknowledged by the server to establish the connection that puts the association into the ready state. It may involve an optionally automated administrative action to advance from the ready state to the active state. It may involve a further step to go from the active state (use the secure relationship but does not believe it) to the authenticated state (believe the identity claimed by the other end). If the invitation message is not verifiable using the trust policy as illustrated in FIG. 2, then the request may be cued awaiting manual approval.

Figure 3:
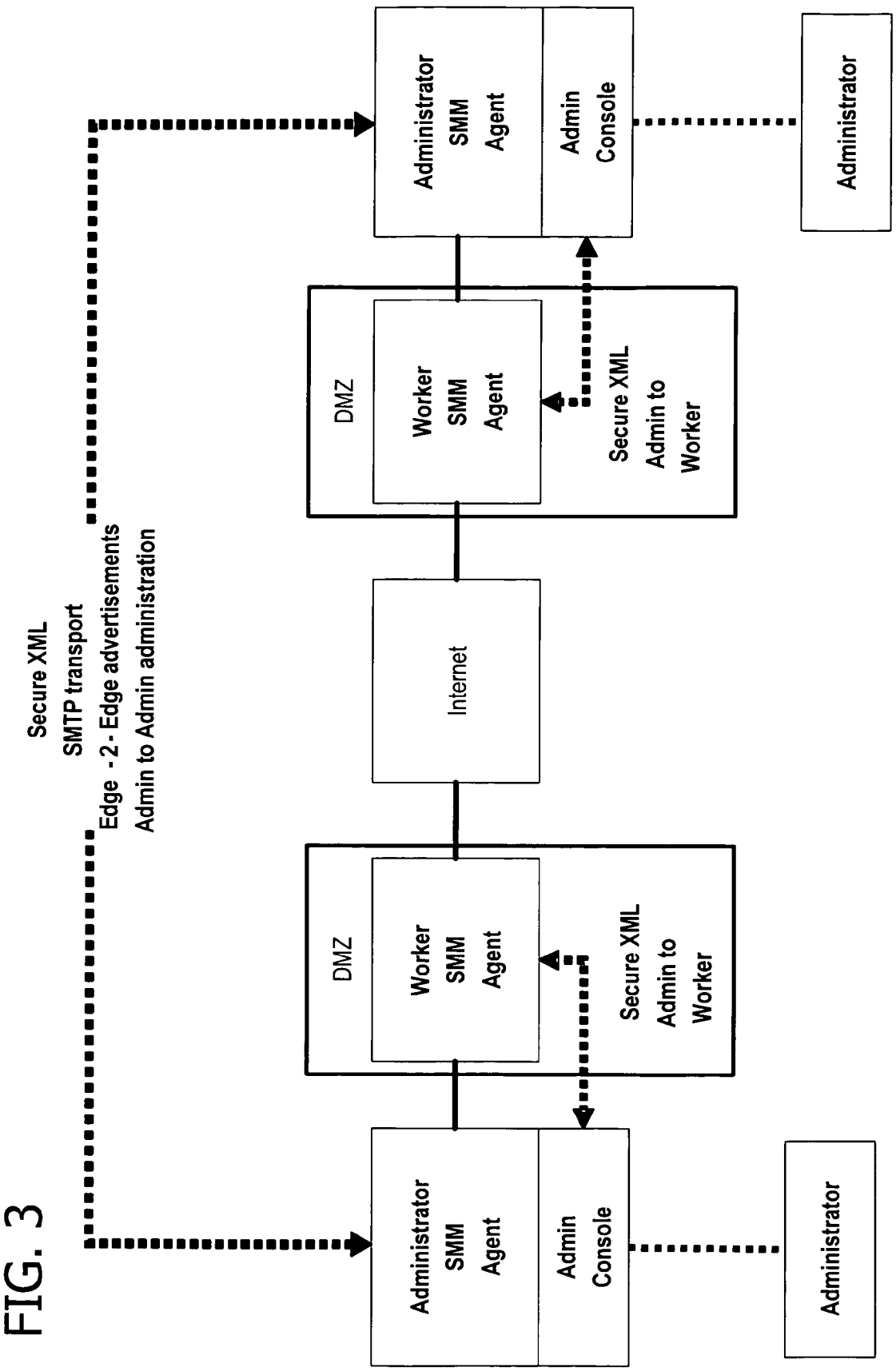
FIG. 3 is an exemplary block diagram illustrating a secure message manager according to the invention.

Referring to FIG. 3, an exemplary block diagram illustrating a secure message manager according to the invention is illustrated. The acceptance of the invitation by the correspondent may create a cross certificate on the administrative SMM agent which is then pushed to the worker SMM agents along with the encryption certificate. (The cross certificate is usually created for authenticated associations (in order to define what they are allowed to authenticate). Active associations have everything except the cross certificate.) The cross certificate constrains the set of names accepted by the new trust and the restriction to domain gateway server communication. At this point, the certificates and information regarding that new association to all the workers is distributed. The session key may also be distributed in this case from administration SMM to all worker SMM so all workers use the same key to reduce cache size. To allow for scaling out, the corresponding decryption private key for the encryption certificate should be available on all internet facing gateway servers to allow any to decrypt inbound mail. This is generated in a single place, i.e., the administration agent, and distributed to all worker servers. Once a trust relationship is established, it should be maintained. For example, the original certificate may be retained and a renewal request sent to the other SMMs before the certificate expires. The child encryption and signing certificate may also be updated frequently.

From the server's perspective, the method according to the invention begins the process to establish a link between a source domain and a correspondent domain. Initially, a source domain server transmits a discovery secret to potential correspondent domains via random or pseudorandom messages. The discovery secret includes a data element such as a mention or a token or other secret which is specifically assigned to the correspondent domain. The discovery secret includes a shared secret which is specific to the correspondent domain (and possibly the source domain). In the preferred embodiment, it is a hash of the seed, the correspondent domain, and the source domain (in some specified order). In addition, the discovery secret includes an address at the source domain to which the correspondent domain is permitted to send a message in order to establish a compatibility between the source domain server and the target computer. The source domain server receives an invitation from the correspondent domain which invitation is addressed to the source domain address previously provided. The invitation includes the data element in the discovery secret or an element which corresponds to the data element in the discovery secret. This allows the source domain server to initiate a process to establish compatibility between the correspondent domain server and the source domain server upon receipt by the source domain server of the invitation from the correspondent domain server. As noted in FIG. 2, the source domain server transmits an acceptance to the correspondent domain server to establish compatibility therebetween.

In one embodiment, the source domain selectively transmits the discovery secret to correspondent domains from which the source domain has sent a message. Alternatively or in addition, the source domain may send discovery secrets to correspondent domains which have been specifically identified in advance.

In one embodiment, the discovery secret may be attached to a message that was sent specifically to carry the discovery secret. In one embodiment of the invention, an email server occasionally adds an additional header (an "x-header") to a message that will be delivered to another email domain. The data in the header includes a secret that is specific to the correspondent domain and the email address to which the administrative messages from the correspondent domain can be directed back to the email server, as well as including the expiration, correspondent domain, sender domain, optional version, and optional features. If mail at the correspondent domain is also directed through a server that implements this embodiment of the invention, then it will detect the additional header and determine that there may be a compatible server at the originating domain. The correspondent domain then directs administrative traffic such as requests to establish a secure connection to the contained administrative email address. Such administrative messages must also contain the secret (referred to above as "discovery secret") that was provided for the correspondent domain. The mail acceptor for administrative mail at the originating domain can then discard any mail that purports to be from the correspondent domain but that does not contain the secret corresponding to the correspondent domain. Although this does not provide absolute assurance that the received administrative mail is from the originating domain, it does minimize the vulnerability to SPAM at the administrative address and ensures that even an attacker that can see email to the correspondent domain can only attempt to spoof administrative addresses from the correspondent domain rather than from any domain.

In one embodiment, the invention is implemented by using a header, called a discovery secret (sometimes called a mention), that is attached to an already outbound email from the source domain. This discovery secret reveals the availability of specific functions on the mail server originating the outbound email while avoiding the need for generating additional, possibly undesirable, messages. As noted above, the administrative email address would be included in the mention and there would be a per-domain secret to mitigate risks of SPAM to the administrative email address. This would support workflow messages at the administrative email address.

The discovery secret may be generated from a hash of the correspondent domain and a secret seed that is kept on the originating server. The discovery secret may also be generated from a hash of the source domain, because the same server may represent multiple source domains. One embodiment could potentially have a special "source" for all domains at the source server. This allows a single seed to be shared across multiple servers, so that each server will generate the same discovery secret unique to any correspondent domain. When an administrative message is received at the originating server (because it is directed to the administrative address included in the mention), the discovery secret provided in the administrative messages is checked by the originating server. To check the discovery secret, the email server can generate (or store) a discovery secret for the domain that sent the administrative message using the current internal seed. If the generated discovery secret is the same as the one in the administrative messages, then that message has the correct discovery secret and is passed through to the appropriate destination for negotiation messages. Negotiation messages are passed between domains. If the discovery secret does not match, then the same process is applied to prior discovery secrets (up to a bounded number). If none of the currently valid seeds can be used to generate a discovery secret that matches the discovery secret in the incoming message, then the message is not considered valid and is discarded or rejected, and not passed on to the eventual destination for administrative messages. This prevents unauthorized SPAM attacks against the receiver of administrative messages, which may be unable to cope with large volumes of email. Additionally, to prevent denial of service attacks from a domain that received a valid discovery secret, the verification process permits the server to keep track of how many messages were recently passed through to the administrative destination from a particular domain or using a particular discovery secret. When that number exceeds an allowed limit or an allowed rate, further administrative messages using that discovery secret are discarded or rejected.

Figure 4:
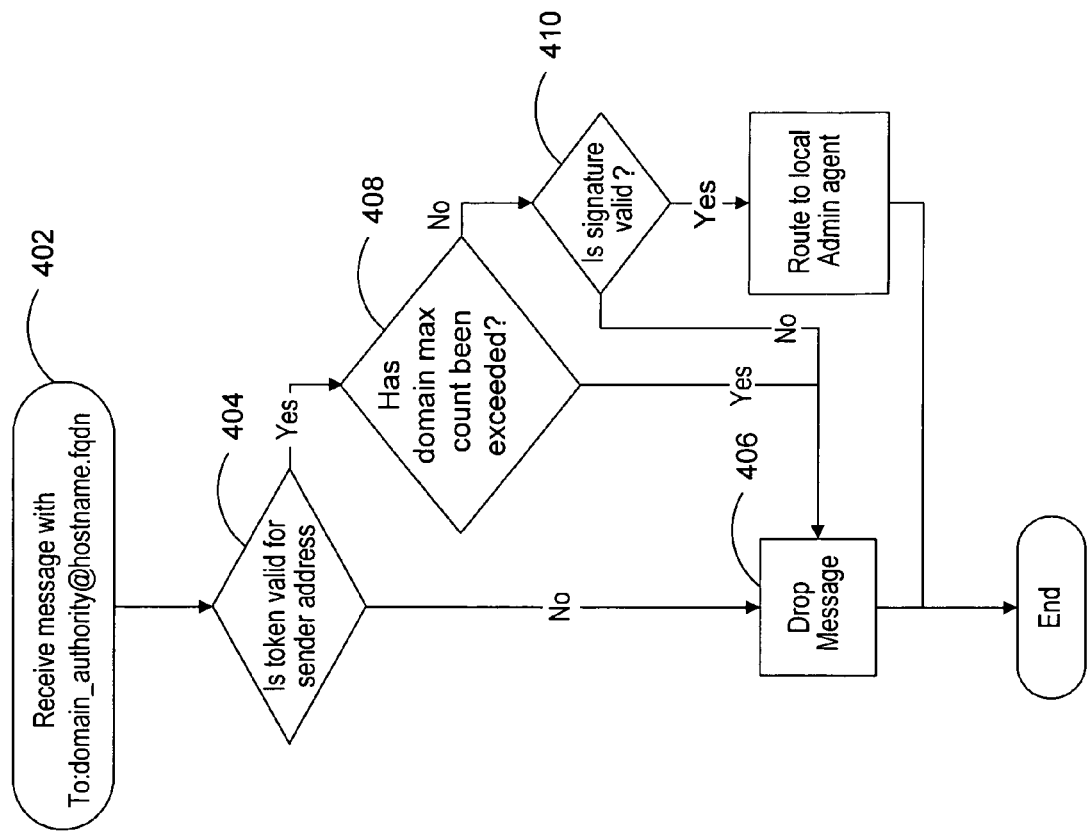
FIG. 4 is a flow diagram illustrating operation of secure message management (SMM) administrative routing according to the invention.

FIG. 4 is a flow diagram illustrating operation of the SMM administrative routing according to the invention. The signature verification and decryption must happen before anti-SPAM processing because the output from the verification is necessary to set the message property flags used by the anti-SPAM agent. Signature verification should happen after the block list and other IP or protocol address level functions. Thus, the process begins with receiving messages at the source domain address to which the correspondent domain is permitted to send a message at 402. If it is determined at 404 that the discovery secret is not valid for the sending domain, the message is dropped at 406 and the routing process ends. If the discovery secret is valid, the process proceeds to 408 to determine if the domain has a maximum amount or rate which has been exceeded. If the maximum has been exceeded, the message is dropped at 406; otherwise, if the signature is valid at 410 the message is routed to the local administrative agent. However, signature verification need not happen in the worker; it usually happens in the SMM.

Figure 5:
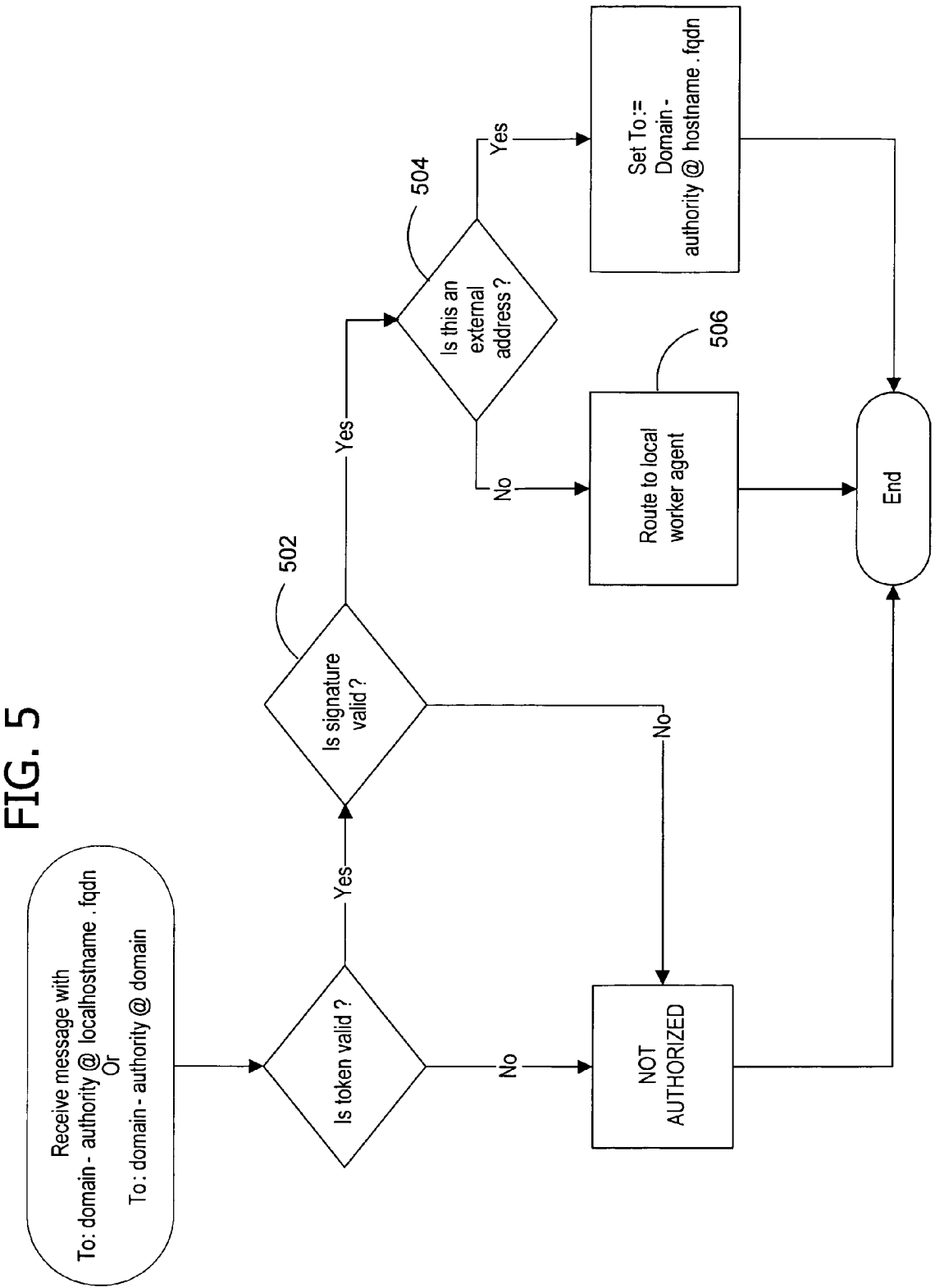
FIG. 5 is a flow diagram illustrating operation of SMM worker routing according to the invention.

FIG. 5 is a flow diagram illustrating operation of SMM worker routing according to the invention. SMM is the Secure Messaging Manager; workers are the servers that the SMM administers/controls and that do the processing of mail traffic. SMM signing and encryption is the last function generally. Each message going to a domain with a secure message association is signed and encrypted. This component also inserts the header containing the current SMM ephemeral address to all mail going to domains without a security relationship. The worker will add discovery secrets as appropriate, but it does not only do so to secure mail. As shown in FIG. 5, the domain looks for a valid signature at 502 and an external address at 504 after finding a valid discovery secret. The discovery secret is only checked in messages that claim to be for the administrator, not in normal mail. If the signature is valid and there is no external address, the message is routed to the local worker agent at 506. If there is an external address, it is routed to such. If the message appears to be domain-secured, an invalid signature is treated identically as if the signature was not present. The message source is not authenticated.

Figure 6:
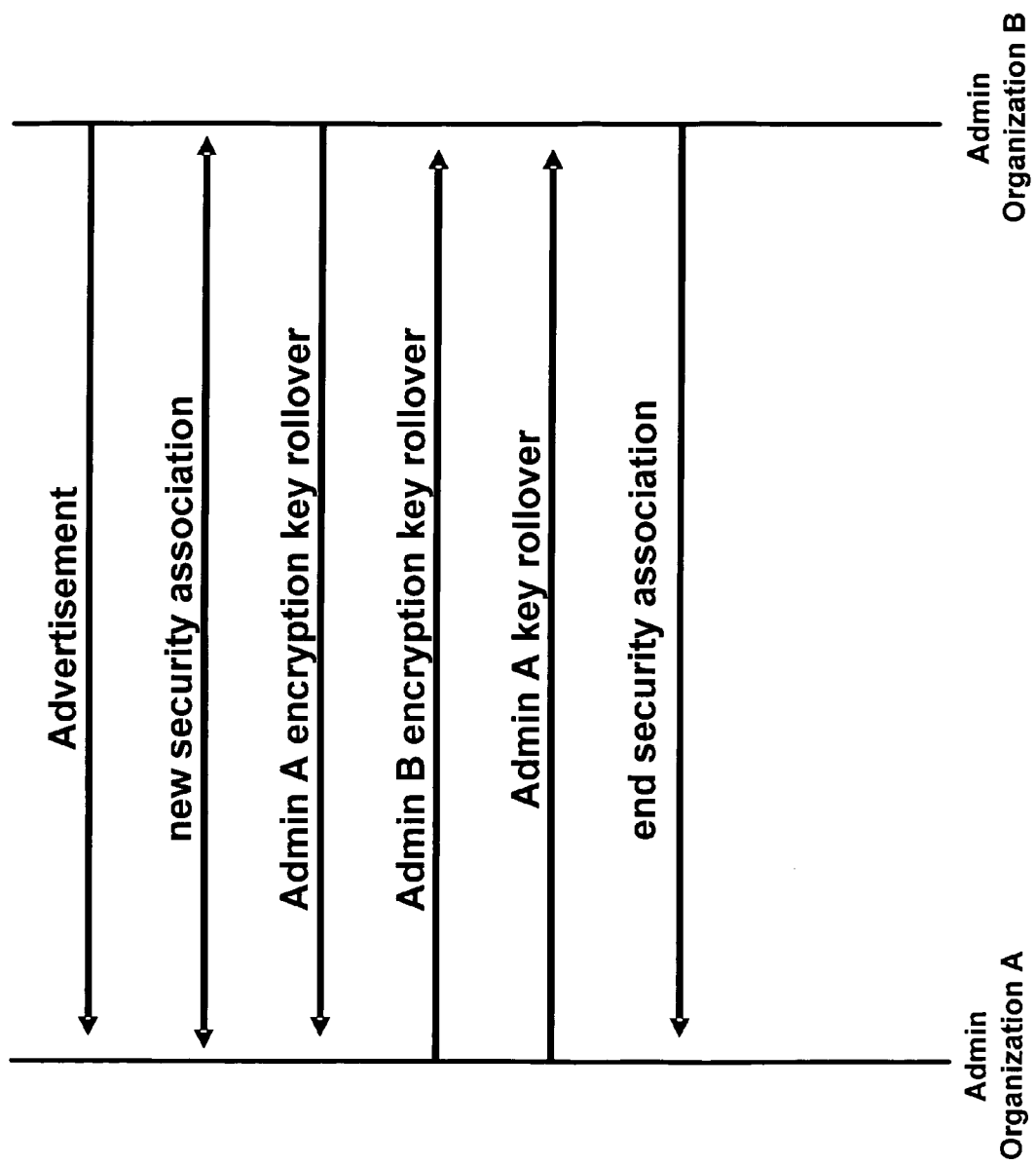
FIG. 6 is an exemplary block diagram illustrating an inter-organization workflow summary between a server (admin organization A) and a correspondent (admin organization B) according to the invention.

In one embodiment, the inter-organizational work flows as illustrated in FIG. 6 are implemented between administrative organizations that represent the lifecycle of a relationship. Other rollovers are possible: keys have certifications associated with them. The certifications may rollover more often than the keys. There are signing, encryption, and authority certifications and keys, all of which rollover independently. Also, there can be later ping/acknowledgement sequences.

Figure 7:
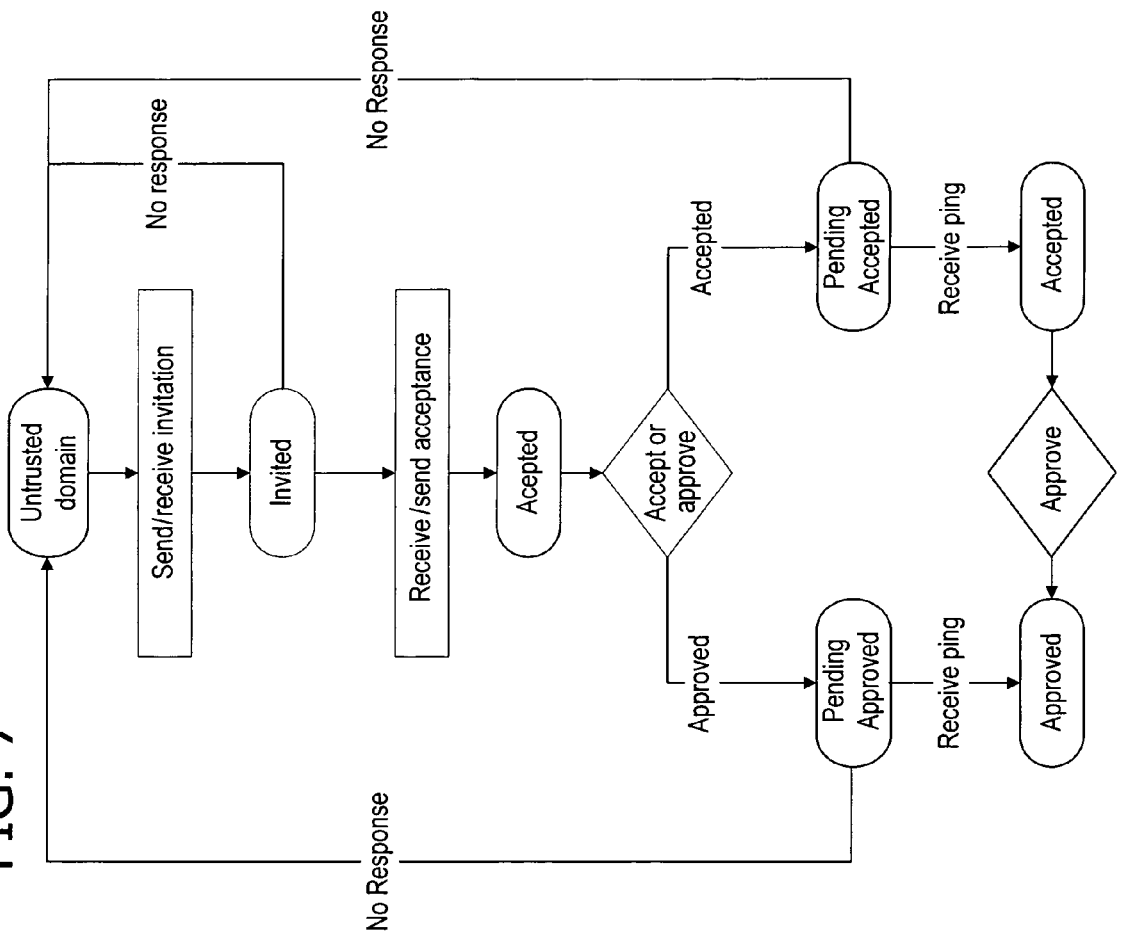
FIG. 7 is a flow diagram illustrating a state diagram after a new security association implemented between a server and a correspondent according to the invention.

The workflow is performed by the SMM administrative agents and may go through an exchange in order to accomplish a rollover (rollover is the term for updating to a new key or certificate). FIG. 7 is a state diagram illustrating the new security association. This diagram only considers the positive cases and the terminal cases. It does not include other aspects such as re-transmission of messages prior to the re-transmission limit.

Other optional features of the invention include the following which may be implemented separately or in combination. The distinction between active and authenticated associations is "optional", as are all the various policies that might be applied to automatically take an administrative transition. The discovery secret may comprise an expiration date in which case the source domain server would not initiate the process to establish compatibility with the correspondent domain computer (e.g., server) computer when receipt by the source domain server of the invitation is after the expiration date so that the shared secret does not become more and more exposed over time. The data element may be at least one of the following: a per domain secret including a random or pseudorandom number for each correspondent domain computer (e.g., server), a secret generated via hashing the correspondent domain computer (e.g., server) and a secret seed that is used to generate per-domain secrets for more than one domain; and a per-domain secret generated by encrypting the correspondent domain computer (e.g., server) and an expiration date of the secret. The data element may comprise a secret in which case the source domain server could remember the secret or could verify the secret received from the correspondent domain computer (e.g., server) by re-computing and then comparing the current secret for the correspondent domain computer (e.g., server) with the secret included in the discovery secret. The data element may be selected from a plurality of multiple secrets which are valid during overlapping times for each correspondent domain computer (e.g., server) so that there are a plurality of valid secrets that can be used for communicating from a correspondent domain computer (e.g., server) to the administrative address of the originating domain. A limit may be imposed on the number of messages that are passed to the source domain server address with a particular data element so that denial of service attacks using a correct data element are mitigated. The source domain server may include the ability to override the requirement for a data element for a given correspondent domain computer (e.g., server) to enable out-of-band authorization to send invitation messages from a particular domain. The data element may be a token in the discovery secret message in a mail header or embedded in the body of a message or the data element may be a token in a mail header and the body of the message remains encrypted when passing through a mail server. The source domain server may support multiple simultaneously valid discovery secrets for the same domain and verify invitation messages from sub-domains of the correspondent domain computer (e.g., server) by verifying the incoming discovery secret against discovery secrets for the correspondent domain computer (e.g., server). The data element may be a discovery secret and include version information for the source domain server and include in the functions supported by the source domain server.

In one embodiment the invention comprises a data structure for the discovery secret to be transmitted from the source domain server to the correspondent domain computer (e.g., server). As noted above, this discovery secret is used to establish compatibility between the source domain server and the correspondent domain computer (e.g., server). Alternatively, it could be used for other purposes between the two domains.

For example, it could be used for them to agree that they will send proprietary TNEF formats rather than text or HTML which would have nothing to do with encryption or security. The data structure includes a message and its usual header relating to the message. Additionally, the data structure includes an additional header attached to the message and message header and including a data element specific to the correspondent domain computer (e.g., server). The header also includes a source domain server address to which the correspondent domain computer (e.g., server) is permitted to send a message to the source domain server in order to establish compatibility between the source domain server and the correspondent domain computer (e.g., server). As noted above, the additional header should include an expiration date, although this is optional.

Alternatively or in addition, the discovery secret may be a message with a single correspondent domain and/or a message to a correspondent domain which is an operator. The single message to the correspondent domain may be for each key and it may be sent on a time-based determination (e.g., one message per hour). For example, the user action may be NDRs or return receipts. In particular, the choice of sending a separate message or attaching to an already being sent message is independent of whether you do it on every message or only occasionally. One crossover case is to wait for a message that has recipients at a single domain (the correspondent domain) rather than attaching the discovery secret to a message that has recipients at multiple domains. In one implementation, the message is split so that the copy going to the recipients at the correspondent domain has the discovery secret for that domain.

Figure 8:
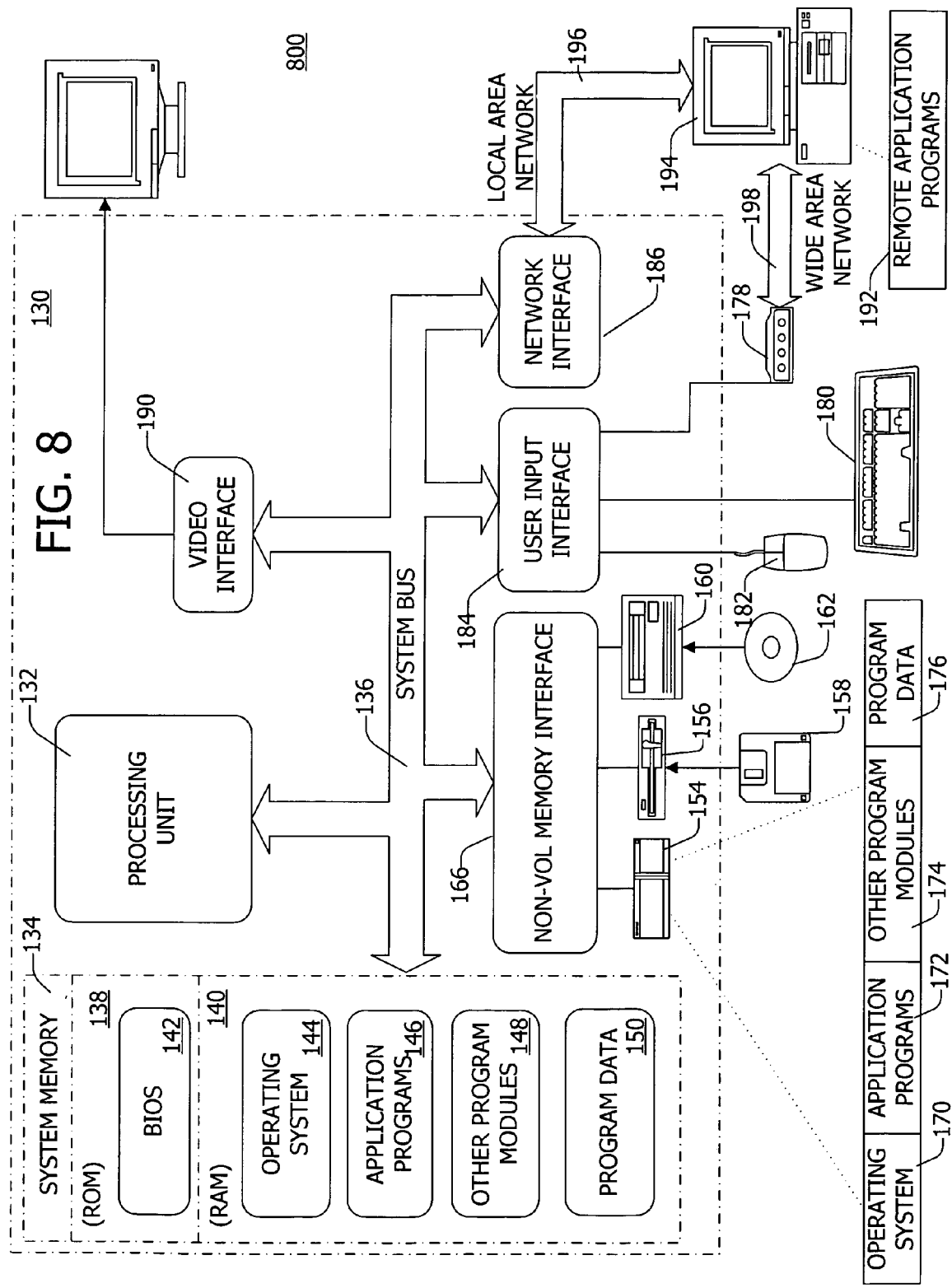
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB).

A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 operates as either the source domain server or the correspondent domain computer (which may be a server) to execute computer-executable instructions as noted above, such as those illustrated in FIGS. 2-7.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having"

are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for determining that a potential correspondent domain has compatible secure email technology in order to establish a link between a server of a source domain and a computer of a correspondent domain comprising:

transmitting a discovery secret from the source domain to the correspondent domain wherein the discovery secret includes a data element specific to the correspondent domain and wherein the discovery secret includes a source domain address to which the correspondent domain sends a message in order to establish compatibility between the source domain and the correspondent domain; and receiving by the source domain via the source domain address an invitation from the correspondent domain wherein the invitation includes the data element or an element corresponding to the data element which may be used by the correspondent domain to initiate a process to establish compatibility with the correspondent domain;

wherein the source domain verifies the data element received from the correspondent domain by re-computing and then comparing the data element receive for the correspondent domain with the data element included in the discovery secret transmitted to the correspondent domain; and wherein the source domain only corresponds with the correspodent domain when the data element provided by the correspondent domain is the same as data element included in the discovery secret so that a denial of service attack from a correspondent domain is mitigated.

2. The method of claim 1 further comprising transmitting an acceptance from the source domain to the correspondent domain to establish that the correspondent and source domains have compatible secure email technology or other email or communication technology.

3. The method of claim 1 wherein the discovery secret is selectively transmitted to at least one of the following:

correspondent domains from which the source domain has received a message;
   correspondent domains specifically identified in advance; and
   correspondent domains via randomly selected messages.

4. The method of claim 1 wherein the discovery secret is a message which is generated in response to user action; wherein the discovery secret is a message with a single correspondent domain; wherein the discovery secret is a message to a correspondent domain which is an operator; wherein the discovery secret is a single message to the correspondent domain for each key; or wherein the discovery secret is a message send on a time-based determination.

5. The method of claim 1 wherein the discovery secret comprises an additional header which includes the data element and the source domain address.

6. The method of claim 1 wherein the discovery secret comprises an expiration date and wherein the source domain does not establish that the correspondent and source domains have compatible secure email technology when receipt by the source domain of the invitation is after the expiration date.

7. The method of claim 1 wherein the data element is at least one of the following:

a per domain secret including a random or pseudorandom number for each correspondent domain;
   a secret generated via hashing the correspondent domain and a secret seed that is used to generate per-domain secrets for more than one domain; and
   a per-domain secret generated encrypting the correspondent domain and an expiration date of the secret.

8. The method of claim 1 wherein the data element is selected from a plurality of multiple simultaneously valid secrets for each correspondent domain so that there are a plurality of valid secrets that can be used for communicating from a correspondent domain to the administrative address of the originating domain.

9. The method of claim 1 further comprising imposing a limit on the number of messages that are passed to the source domain address with a particular data element whereby denial of service attacks using a correct data element are mitigated.

10. The method of claim 1 further comprising including the ability to override the requirement for a data element for a given correspondent domain to enable out-of-band authorization to send invitation messages from a particular domain.

11. The method of claim 1 wherein the data element is a token in the discovery secret message in a mail header or embedded in the body of a message or wherein the data element is a token in a mail header and the body of the message remains encrypted when passing through a mail server.

12. The method of claim 1 further comprising supporting multiple simultaneously valid tokens for the same domain and verifying invitation messages from sub-domains of the correspondent domain by verifying the incoming token against tokens for the correspondent domain.

13. The method of claim 1 wherein the data element is a mention and further comprising including in the mention of version information for the source domain and including in the mention functions supported by the source domain.

14. A computer-readable media having stored thereon a data structure for a discovery secret to be transmitted from a source domain to a correspondent domain for establishing that the correspondent and source domains have compatible secure email technology comprising:

A message;
   A header relating to the message; and
   An additional header attached to the message and including (1) a data element specific to the correspondent domain and (2) including a source domain address to which the correspondent domain sends a message to the source domain in order to establish that the correspondent and source domains have compatible secure email technology, and (3) an expiration date, wherein the data element is at least one of the following:
   a secret generated via hashing the correspondent domain and a secret seed that is used to generate per-domain secrets for more than one domain;
   a data element selected from a plurality of multiple overlapping secrets for each correspondent domain so that there are a plurality of valid secrets that can be used for communicating from a correspondent domain to the administrative address of the originating domain; and a mention and further comprising including in the mention version information for the source domain and including in the mention functions supported by the source domain;

wherein the source domain verifies the data element received from the correspondent domain by re-computing and then comparing the current secret for the correspondent domain with the data element included in the discovery secret.

15. A system for establishing that the correspondent and source domains have compatible secure email technology, comprising:

A source domain server transmitting a discovery secret to the correspondent domain wherein the discovery secret includes a data element specific to the correspondent domain and wherein the discovery secret includes a source domain address to which the correspondent domain sends a message in order to establish that the correpondent and source domains have compatible secure email technology; and A correspondent domain computer receiving the discovery secret including the data element and the source domain address wherein the correspondent domain computer transmits an invitation from the correspondent domain to the source domain address wherein the invitation includes the data element or an element corresponding to the data element, wherein the data element is at least one of the following:

a secret generated via hashing the correspondent domain and a secret seed that is used to generate per-domain secrets for more than one domain;

a data element selected from a plurality of multiple overlapping secrets for each correspondent domain so that there are plurality of valid secrets that can be used for communicating from a correspondent domain to the administrative address of the originating domain;

a mention and further comprising including in the mention version information for the source domain and including in the mention functions supported by the source domain;

wherein the source domain verifies the data element received from the correspondent domain by re-computing and then comparing the current secret for the correspondent domain with the data element included in the discovery secret.

16. The system of claim 15 wherein the source domain server transmits an acceptance from the source domain to the correspondent domain to establish that the correspondent and source domains have compatible secure email technology and wherein the source domain server initiates a process to establish a link with the correspondent domain computer upon receipt by the source domain server of the invitation; and further comprising at least one of the following:

imposing a limit on the number of messages that are passed to the source domain address with a particular data element whereby denial of Service attacks using a correct data element are mitigated;

overriding the requirement for a data element for a given correspondent domain to enable out-of-band authorization to send invitation messages from a particular domain; and supporting multiple simultaneously valid tokens for the same domain and verifying invitation messages from sub-domains of the correspondent domain by verifying the incoming discovery secret against discovery secrets for the correspondent domain.

17. The system of claim 15 wherein the discovery secret transmitted by the source domain service comprises at least one of the following:

A discovery secret selectively transmitted to correspondent domains from which the source domain has received a message;

a discovery secret selectively transmitted to correspondent domains specifically identified in advance or randomly selected correspondent domains;

a message which is generated in response to user action;

a message with a single correspondent domain;

a message to a correspondent domain which is a server's operator address;

a single message to the correspondent domain for each key;

a message send on a time-based determination;

an additional header which includes the data element and the source domain address; and an expiration date and wherein the source domain does not initiate the process to establish a link with the correspondent domain when receipt by the source domain of the invitation is after the expiration date.

* * * * *